UNITED STATES PATENT OFFICE.

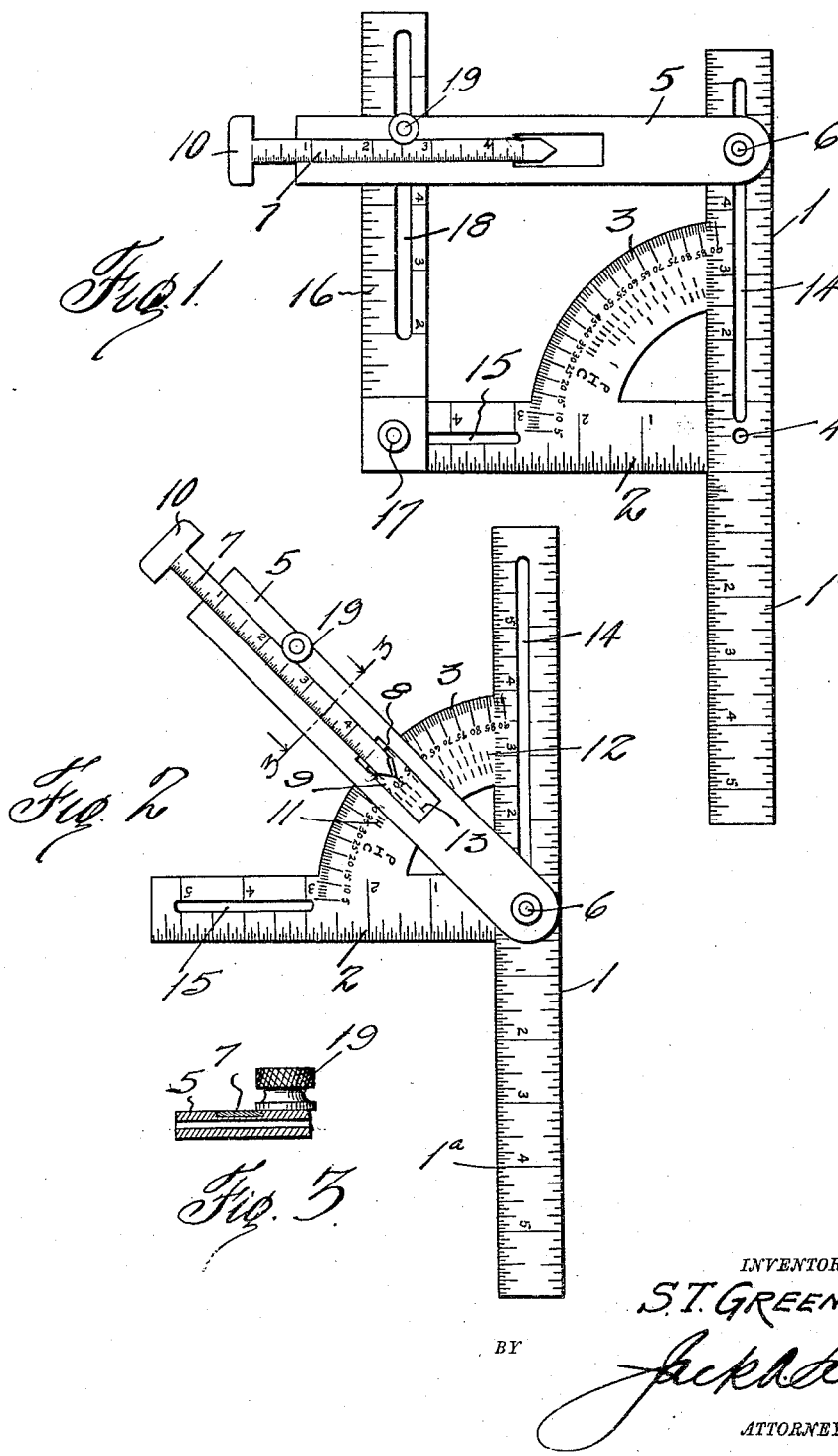

SAUNDERS T. GREENE, OF DALLAS, TEXAS.

MEASURING-TOOL.

1,290,977.  Specification of Letters Patent.  Patented Jan. 14, 1919.

Application filed July 5, 1918. Serial No. 243,419.

*To all whom it may concern:*

Be it known that I, SAUNDERS T. GREENE, a citizen of the United States, residing at Dallas, in the county of Dallas and State of Texas, have invented certain new and useful Improvements in Measuring - Tools, of which the following is a specification.

This invention relates to new and useful improvements in measuring tools.

It is proposed to provide a tool in the nature of a bevel and square which is graduated so as to give all the measurements of the usual try-square and is also equipped with an adjustable blade and protractor for securing angular cuts and bevels.

It is also proposed to equip the tool so that it can be used as a gage for cutting recesses and marking off parallel lines; also to provide a thickness gage which may also be used as a pointer in connection with the protractor. In carrying out the invention an elongated measuring blade is bisected by a right-angular measuring blade which is connected with the first blade by a protractor leaving on the opposite side a regular try-square. The right-angular blade is provided with an extension which is disposed parallel with the long blade. A beveling blade is pivoted concentric with the protractor or may be removed and disposed in slots in the extension and the long blade for coöperating with the short blade for marking parallel lines.

The invention will be more readily understood from a reading of the following specification and by reference to the accompanying drawings, in which an example of the invention is illustrated, wherein—

Figure 1 is a plan view of a tool constructed in accordance with this invention, and adjusted for making parallel cuts, Fig. 2 is a plan view of the same tool with the extension removed and the beveling blade adjusted for marking angular cuts, and Fig. 3 is a cross sectional view on the line 3—3 of Fig. 2.

In the drawings the numeral 1 designates an elongated blade or bar which is bisected by a short bar 2 at right angles thereto. On one side the blades 1 and 2 are connected by a protractor 3 formed integral therewith; while on the other side the adjacent edges of the bars 1 and 2 are graduated in inches to form the usual try-square. The long blade 1 has an aperture 4 coincident with the center of the protractor 3. A gage member 5 is bifurcated to receive the protractor 3 and extend over the center of the blade 1 so that its thumb screw 6 may be fitted in the hole 4. A slide bar 7 is confined in the gage 5 and has a pointed end 8 projecting into a slot 9 through which the graduations of the protractor are exposed. The point 8 may be used as an index in adjusting the gage 5 arcuately by registering the said point with the particular graduation desired. The bar 7 has a shouldered head 10 and is graduated from the intersection of the head and the bar so that thicknesses may be measured by receiving the material between the head and the end of the member 5.

The protractor 3 carries the usual degree graduations and may have any other scales as the common rafter cuts 11, hip rafter cuts 12 and polygon cuts 13. When used for cutting roof rafters the member 5 is placed against the side of the rafter with the blade end 1ª across the rafter whereby the angle of the plumb cut is had; then by removing the instrument to the other end of the rafter, the graduated edge of the blade 2 gives the angle of the bottom cut. The gage 5 is adjusted to the graduation which is designated on the scale for giving the desired cuts, and by placing the gage 5 against the edge of the timber the parts 1ª and 2 will give the cuts. The device has various other uses which are evident.

The member 1 has a slot 14, and the member 2 a slot 15. An extension blade 16 is provided and carries a thumb screw 17 engaging in the slot 15 for the purpose of fastening. The blade 16 has a longitudinal slot 18. When the extension blade is used the thumb screw 6 is removed from the hole 4 and placed in the slot 14. A thumb screw 19 carried by the gage 5 is engaged in the slot 18. The blade 16 is parallel to the blade 1 so that the slots 14 and 18 will be parallel and the slot 15 will be at right angles thereto. The blade 16 carries graduations registering with like graduations on the blade 1 and thus the gage 5 may be adjusted at different distances from the blade 2 and parallel therewith by registering it with like graduations. With the gage 5 placed against the top edge of a timber the bottom edge of the bar 2 will give the bottom of a recess to be cut in the timber and thus several recesses may be marked at the same depth although the timber may vary in width. By adjusting the blades 16 toward and from the blade 1 lines may be drawn at right angles to the edge of the blade 2 and thus the length of the recesses marked off or other calculations made.

Many uses for the tool will be found and no attempt is made herein to outline the same nor is any attempt made to illustrate the scales and graduations in detail. Such a tool will be useful for carpenters and mechanics in their various lines of work.

What I claim is,

In a tool of the character described, an elongated blade, a short blade bisecting the long blade, a protractor connecting the blades and integral therewith, a gage pivoted at the intersection of the two blades and at the center of the protractor, said gage having an opening exposing the face of the protractor, and a bar slidably confined in the gage and having a pointed end extending into the opening of the gage for registration with the graduations of the protractor.

In testimony whereof I affix my signature.

SAUNDERS T. GREENE.

Copies of this patent may be obtained for five cents each, by addressing the "Commissioner of Patents, Washington, D. C."